US012267675B2

(12) United States Patent
Vlasach

(10) Patent No.: US 12,267,675 B2
(45) Date of Patent: Apr. 1, 2025

(54) SECONDARY DEVICE ENROLLMENT VALIDATION

(71) Applicant: JAMF Software, LLC, Minneapolis, MN (US)

(72) Inventor: Matthew Vlasach, Larkspur, CA (US)

(73) Assignee: JAMF Software, LLC, Minneapolis, MN (US)

( * ) Notice: Subject to any disclaimer, the term of this patent is extended or adjusted under 35 U.S.C. 154(b) by 206 days.

(21) Appl. No.: 18/186,726

(22) Filed: Mar. 20, 2023

(65) Prior Publication Data

US 2024/0323017 A1 Sep. 26, 2024

(51) Int. Cl.
*H04W 12/06* (2021.01)
*G06F 21/44* (2013.01)
*H04L 9/08* (2006.01)
*H04L 9/32* (2006.01)

(52) U.S. Cl.
CPC ............ *H04W 12/06* (2013.01); *G06F 21/44* (2013.01); *H04L 9/0825* (2013.01); *H04L 9/3213* (2013.01); *H04L 9/3271* (2013.01)

(58) Field of Classification Search
None
See application file for complete search history.

(56) References Cited

U.S. PATENT DOCUMENTS

| 2015/0295901 A1* | 10/2015 | Woodward | H04L 63/061 713/168 |
| 2018/0213405 A1* | 7/2018 | Jung | H04W 12/069 |
| 2020/0128396 A1* | 4/2020 | Mars | H04W 12/50 |

FOREIGN PATENT DOCUMENTS

| JP | 2019029917 A | * | 2/2019 | |
| WO | WO-2017003651 A1 | * | 1/2017 | G06F 21/35 |

* cited by examiner

*Primary Examiner* — Benjamin E Lanier
(74) *Attorney, Agent, or Firm* — Benesch Friedlander Coplan & Aronoff LLP

(57) ABSTRACT

In certain aspects, methods include, responsive to receiving verification that credentials associated with an organization device (OD) is authenticated, requesting the OD to create a token comprising a private and public key. The method includes receiving, subsequent to the OD initiating creation of the token, the public key from the OD. The method includes associating the public key with an UPN of the OD, and includes requesting the organization credentials from a secondary device (SD), responsive to detecting a request therefrom. The method includes requesting, responsive to authentication of the organization credentials, a challenge response from the SD. The method includes receiving the challenge response from the SD, which signed the challenge response with the private key that was transferred via the OD. The method includes determining, with the public key, whether the challenge response is valid, and includes validating enrollment of the SD when the challenge response is validated.

20 Claims, 6 Drawing Sheets

SECONDARY DEVICE ENROLLMENT VALIDATION

TECHNICAL FIELD

The present disclosure generally relates to mobile devices and management systems, and more specifically relates to enrollment validation of a secondary device.

BACKGROUND

Some device enrollment processes can be prone to attack vectors due to potential vulnerabilities of certain modern zero-trust architectures. For instance, if an attacker has compromised a user's credentials, and knows the process of how to "register" the user's device with the organization's device management infrastructure, then the attacker is able to enroll his/her unauthorized device in a manner that makes the unauthorized device authorized. As a result, the attacker's device, which is now authorized, is treated as legitimate and "trusted" by the zero trust system, thereby granting access to the organization's systems to which the compromised user has access via the attacker's illegitimate device. While some attempts have been made to safe guard against such potential vulnerabilities, such as, for example, monitoring "impossible travel logins" (e.g., the "same" user logs in from different geographies that would be impossible due to actual travel time between locations and login time stamps) and using Multi-factor authentication (MFA), it is desirable to create a process that provides further security against these potential vulnerabilities.

The description provided in the background section should not be assumed to be prior art merely because it is mentioned in or associated with the background section. The background section may include information that describes one or more aspects of the subject technology.

SUMMARY

In particular aspects, the present disclosure provides systems and methods for enrollment validation of a secondary device. For example, a user of an organization owned device, which is enrolled into the management infrastructure of the organization (e.g., a mobile device management service), may wish to enroll a secondary device (e.g., a personal device of the user or another device that has not yet been enrolled into the management infrastructure of the organization). The organization owned device is pre-registered in the management infrastructure via a pre-known opaque identifier, such as the device's serial number or other hardware ID. On that pre-registered organization owned device, the user logs in with his organization credentials. After the user's organization credentials are authenticated, the organization owned device initiates creation of a security token using a public/private key pair. The private key portion of the security token is stored securely on the organization owned device and/or user's secret manager (e.g., a password management system), while the public key is transmitted to the management infrastructure. Upon receipt of the public key, the management infrastructure associates the public key with a User Principle Name (UPN) associated with the user that is stored in the management infrastructure.

With the organization owned device enrolled with the management infrastructure, the user can then enroll the secondary device. For example, the user logs into the secondary device using his organization credentials, and the user of the secondary device is successfully authenticated. Based on the organization owned device already being enrolled, the management infrastructure detects that the secondary device requires enrollment and challenges the secondary device with a challenge string. Using the private key portion of the security token, the secondary device cryptographically signs the challenge string and returns it to the management infrastructure (challenge response). Using the public key of the security token that was stored during the registration of the organization managed device, the management infrastructure cryptographically validates the challenge response. If the validation succeeds, then enrollment process proceeds for the secondary device. On the other hand, if the cryptographic challenge response fails validation, then enrollment of the secondary device is denied or other exception measures are required to proceed with enrollment.

According to certain aspects of the present disclosure, a computer-implemented method is provided. The method includes, responsive to receiving a verification that organization credentials associated with an organization owned device is authenticated, requesting the organization owned device to create a security token, wherein the security token comprises a private key and a public key. The method includes receiving, subsequent to the organization owned device initiating creation of the security token, the public key from the organization owned device. The method associating the public key with a User Principle Name associated with the organization owned device. The method includes detecting an enrollment request from the secondary device, and subsequently requesting the organization credentials from the user of the secondary device. The method includes generating, in response to the organization credentials from the secondary device being authenticated, a challenge to be signed by the secondary device. The method includes using the private key of the security token to sign the challenge on the secondary device, wherein the private key is transferred to the secondary device via the organization owned device using various available means. The method includes determining whether the challenge response is cryptographically validated by the public key of the security token. The method includes enrollment of the secondary device based upon the outcome of the challenge response validation process.

According to certain other aspects of the present disclosure, a computer-implemented method is provided. The method includes, responsive to receiving a verification that organization credentials associated with an organization owned device is authenticated, requesting the organization owned device to create a security token, wherein the security token comprises a private key and a public key. The method includes receiving, subsequent to the organization owned device initiating creation of the security token, the public key from the organization owned device. The method includes associating the public key with a User Principle Name associated with a user of the organization owned device. The method includes, responsive to detecting an enrollment request from the secondary device, requesting the organization credentials from the secondary device. The method includes requesting, in response to the organization credentials from the secondary device being authenticated, a challenge response from the secondary device. The method includes receiving the challenge response from the secondary device, wherein the challenge response is cryptographically signed by the secondary device with the private key, wherein the private key was transferred to the secondary device via the organization owned device. The method includes determining, with the public key, whether the challenge response is valid. The method includes validating, based on determining the challenge response is valid, enrollment of the secondary device.

According to other aspects of the present disclosure, a system is provided. The system includes a memory comprising instructions and a processor configured to execute the instructions which, when executed, cause the processor to, responsive to receiving a verification that organization credentials associated with an organization owned device is authenticated, request the organization owned device to create a security token, wherein the security token comprises a private key and a public key. The processor is configured to execute the instructions which, when executed, cause the processor to receive, subsequent to the organization owned device initiating creation of the security token, the public key from the organization owned device. The processor is configured to execute the instructions which, when executed, cause the processor to associate the public key with a User Principle Name associated with the organization owned device. The processor is configured to execute the instructions which, when executed, cause the processor to, responsive to detecting an enrollment request from the secondary device, request the organization credentials from the secondary device. The processor is configured to execute the instructions which, when executed, cause the processor to, request, in response to the organization credentials from the secondary device being authenticated, the a challenge response from the secondary device. The processor is configured to execute the instructions which, when executed, cause the processor to receive the challenge response from the secondary device, wherein the private key was previously transferred to the secondary device via the organization owned device using available means. The processor is configured to execute the instructions which, when executed, cause the processor to determine whether the challenge response was generated successfully on the secondary device using the authorized private key as validated by the public key stored in the processor. The processor is configured to execute the instructions which, when executed, cause the processor to validate, based on successful cryptographic validation of the challenge response, enrollment of the secondary device.

According to other aspects of the present disclosure, a system is provided. The system includes a memory comprising instructions and a processor configured to execute the instructions which, when executed, cause the processor to, responsive to receiving a verification that organization credentials associated with an organization owned device is authenticated, request the organization owned device to create a security token, wherein the security token comprises a private key and a public key. The system includes a memory comprising instructions and a processor configured to execute the instructions which, when executed, cause the processor to receive, subsequent to the organization owned device initiating creation of the security token, the public key from the organization owned device. The system includes a memory comprising instructions and a processor configured to execute the instructions which, when executed, cause the processor to associate the public key with a User Principle Name associated with a user of the organization owned device. The system includes a memory comprising instructions and a processor configured to execute the instructions which, when executed, cause the processor to, responsive to detecting an enrollment request from the secondary device, request the organization credentials from the secondary device. The system includes a memory comprising instructions and a processor configured to execute the instructions which, when executed, cause the processor to request, in response to the organization credentials from the secondary device being authenticated, a challenge response from the secondary device. The system includes a memory comprising instructions and a processor configured to execute the instructions which, when executed, cause the processor to receive the challenge response from the secondary device, wherein the challenge response is cryptographically signed by the secondary device with the private key, wherein the private key was transferred to the secondary device via the organization owned device. The system includes a memory comprising instructions and a processor configured to execute the instructions which, when executed, cause the processor to determine, with the public key, whether the challenge response is valid. The system includes a memory comprising instructions and a processor configured to execute the instructions which, when executed, cause the processor to validate, based on determining the challenge response is valid, enrollment of the secondary device.

According to other aspects of the present disclosure, a non-transitory machine-readable storage medium comprising machine-readable instructions for causing a processor to execute a method is provided. The method includes, responsive to receiving a verification that organization credentials associated with an organization owned device is authenticated, requesting the organization owned device to create a security token, wherein the security token comprises a private key and a public key. The method includes receiving, subsequent to the organization owned device initiating creation of the security token, the public key from the organization owned device via various available means. The method associating the public key with a User Principle Name associated with the organization owned device. The method includes responsive to detecting an enrollment request from the secondary device, requesting the organization credentials from the secondary device. The method includes requesting, in response to the organization credentials from the secondary device being authenticated, the private key from the secondary device. The method includes receiving the private key from the secondary device, wherein the private key is transferred to the secondary device via the organization owned device. The method includes determining whether the public key matches the private key. The method includes validating, based on determining the public key matches the private key, enrollment of the secondary device.

According to other aspects of the present disclosure, a non-transitory machine-readable storage medium comprising machine-readable instructions for causing a processor to execute a method is provided. The method includes, responsive to receiving a verification that organization credentials associated with an organization owned device is authenticated, requesting the organization owned device to create a security token, wherein the security token comprises a private key and a public key. The method includes receiving, subsequent to the organization owned device initiating creation of the security token, the public key from the organization owned device. The method includes associating the public key with a User Principle Name associated with a user of the organization owned device. The method includes, responsive to detecting an enrollment request from the secondary device, requesting the organization credentials from the secondary device. The method includes requesting, in response to the organization credentials from the secondary device being authenticated, a challenge response from the secondary device. The method includes receiving the challenge response from the secondary device, wherein the challenge response is cryptographically signed by the secondary device with the private key, wherein the private key was transferred to the secondary device via the organization owned device. The method includes determining, with the public key, whether the challenge response is valid. The method includes validating, based on determining the challenge response is valid, enrollment of the secondary device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. It should be noted that although various aspects may be described herein with reference to corporate, organization, healthcare, retail, or educational settings, these are examples only and are not to be considered limiting. The teachings of the present disclosure may be applied to any mobile device environments, including but not limited to organization environments, home environments, healthcare environments, retail environments, educational environments, corporate environments, and other appropriate environments. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The disclosed technology provides systems and methods for enrollment validation of a secondary device by leveraging security tokens.

The disclosed technology provides a solution to potential attack of modern zero-trust architecture during enrollment validation of a secondary device. For example, the disclosed technology utilizes phishing-resistant security tokens that cannot be easily shared or compromised unlike passwords used in traditional multi-factor techniques. The security tokens of the disclosed technology cannot be viewed, emailed, or otherwise shared with a secondary device unless in direct physical proximity (e.g., within a few feet) of the enrolled device (e.g., organization owned device 10) storing the private key of the security token.

In certain aspect, the disclosed technology further provides solutions to such security risks during enrollment validation of a secondary device by leveraging additional layers of authentication that may be managed separately from an organization's IT staff or identity service. For example, in such aspects, the security tokens are managed by the OS and platform vendor, and cannot be managed or changed even with super administrator organization identity credentials.

Figure 1:
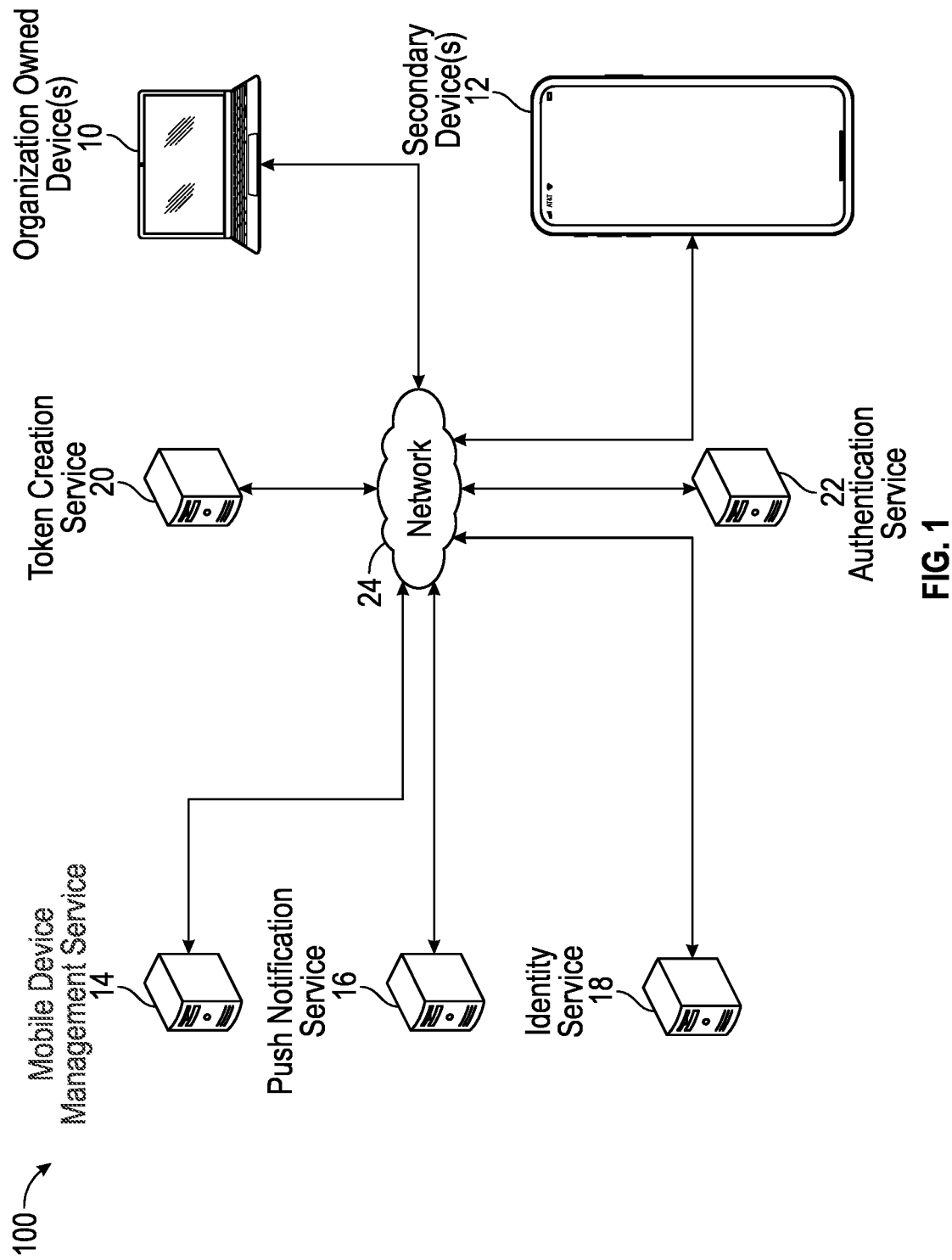
FIG. 1 illustrates an example architecture for enrollment validation of a secondary device.

FIG. 1 illustrates an example architecture 100 for enrollment validation of a secondary device. For example, the architecture 100 includes at least one organization owned device 10, at least one secondary device 12, a mobile device management service 14, a push notification service 16, an identity service 18, a token creation service 20, and an authentication service 22 all connected over a network 24. In certain aspects, the mobile device management service 14 may be connected to the push notification service 16 over a separate network.

The mobile device management service 14 can be any device having an appropriate processor, memory, and communications capability for communicating with the at least one organization owned device 10, the at least one secondary device 12, the push notification service 16, the identity service 18, the token creation service 20, and the authentication service 22. For purposes of load balancing, the mobile device management service 14 may include multiple servers. The push notification service 16, identity service 18, the token creation service 20, and the authentication service 22 can all be any device having an appropriate processor, memory, and communications capability for communicating with the mobile device management service 14, the at least one organization owned device 10, and the at least one secondary device 12.

The at least one organization owned device 10, to which the mobile device management service 14 communicates with over the network 24 via the push notification service 16, can be, for example, a tablet computer, a mobile phone, a mobile computer, a laptop computer, a portable media player, an electronic book (eBook) reader, or any other device having appropriate processor, memory, and communications capabilities. Similarly, the at least one secondary device 12, to which the mobile device management service 14 communicates with over the network 24 via the push notification service 16, can be, for example, a tablet computer, a mobile phone, a mobile computer, a laptop computer, a portable media player, an electronic book (eBook) reader, or any other device having appropriate processor, memory, and communications capabilities. In certain aspects, the mobile device management service 14, the push notification service 16, the identity service 18, the token creation service 20, and the authentication service 22 can be a cloud computing server of an infrastructure-as-a-service (IaaS) and be able to support a platform-as-a-service (PaaS) and software-as-a-service (SaaS) services.

It should be noted that although the at least one organization owned device 10 and the at least one secondary device 12 are shown in FIG. 1 as single devices, the present disclosure is not limited to any particular configuration or number of devices. In certain aspects, a different number of organization owned devices and/or secondary devices may be present.

The network 24 can include, for example, any one or more of a personal area network (PAN), a local area network (LAN), a campus area network (CAN), a metropolitan area network (MAN), a wide area network (WAN), a broadband network (BBN), the Internet, and the like. Further, the network 24 can include, but is not limited to, any one or more of the following network topologies, including a bus network, a star network, a ring network, a mesh network, a star-bus network, tree or hierarchical network, and the like.

Figure 2:
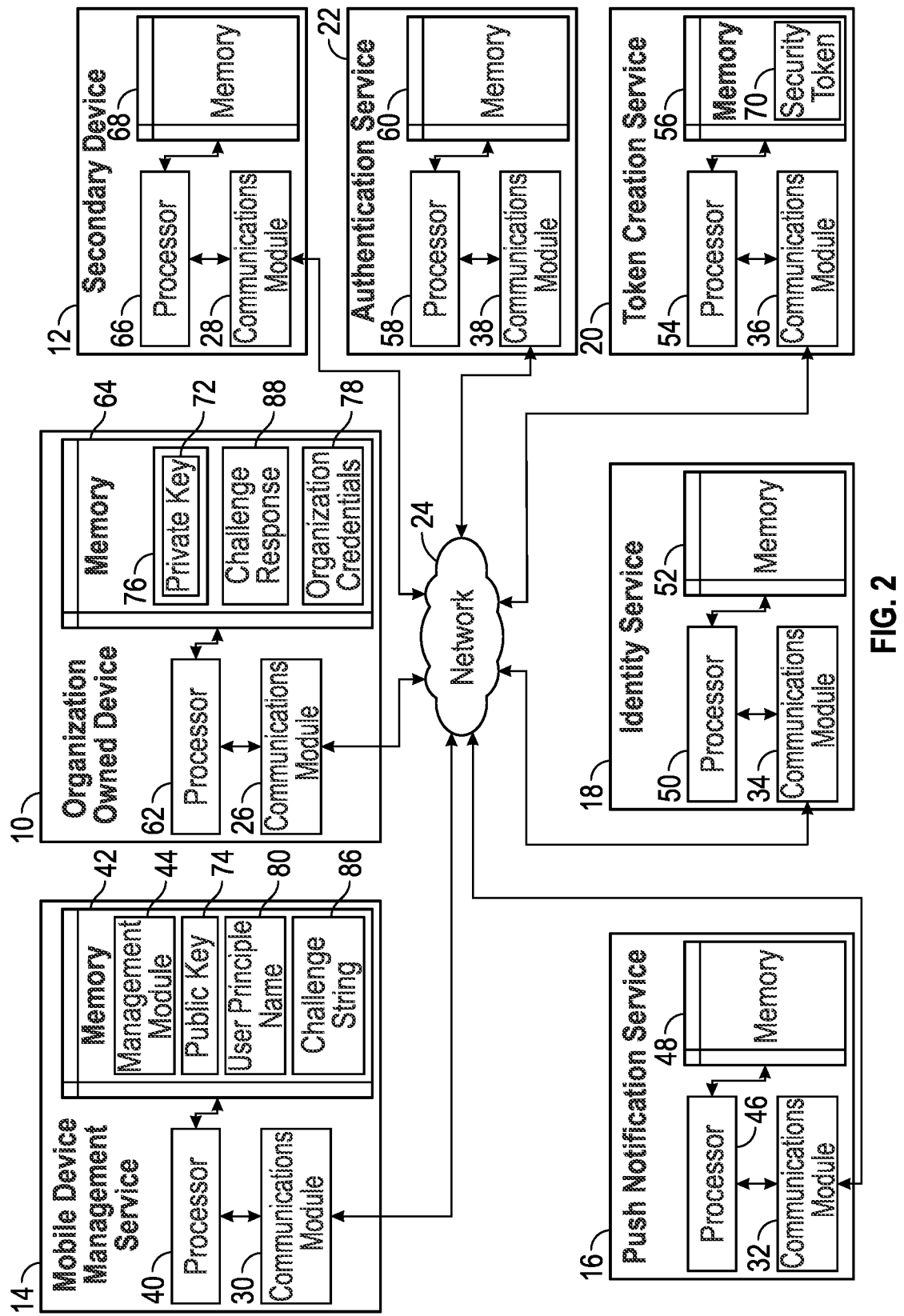
FIG. 2 is a block diagram illustrating the example at least one organization owned device, at least one secondary device, mobile management service, push notification service, identity service, token creation service, and authentication service from the architecture of FIG. 1 according to certain aspects of the disclosure.

FIG. 2 is a block diagram illustrating examples of the at least one organization owned device 10, the at least one secondary device 12, the mobile device management service 14, the push notification service 16, the identity service 18, the token creation service 20, and the authentication service 22 in the architecture of FIG. 1 according to certain aspects of the disclosure. It should be understood that for purposes of explanation the at least one organization owned device 10 and the at least one secondary device 12 are described, but any number of the at least one organization owned device 10 and the at least one secondary device 12 could be used.

The at least one organization owned device 10, the at least one secondary device 12, the mobile device management service 14, the push notification service 16, the identity service 18, the token creation service 20, and the authentication service 22 are connected over the network 24 via respective communication modules 26, 28, 30, 32, 34, 36, 38. The communication modules 26, 28, 30, 32, 34, 36, 38 are configured to interface with the network 24 to send and receive information, such as data, requests, responses, and commands to other devices on the network 24. The communications modules 26, 28, 30, 32, 34, 36, 38 can be, for example, modems or Ethernet cards.

The mobile device management service 14 includes a processor 40, the communications module 30, and a memory 42 that includes a management module 44. The processor 40 of the mobile device management service 14 is configured to execute instructions, such as instructions physically coded into the processor 40, instructions received from software in the memory 42, or a combination of both. The mobile device management service 14 is configured to, responsive to receiving a verification that organization credentials associated with an organization owned device is authenticated, request the organization owned device to create a security token, wherein the security token comprises a private key and a public key. The mobile device management service 14 is configured to receive, subsequent to the organization owned device initiating creation of the security token, the public key from the organization owned device. The mobile device management service 14 is configured to associate the public key with a User Principle Name associated with a user of the organization owned device. The mobile device management service 14 is configured to, responsive to detecting an enrollment request from the secondary device, request the organization credentials from the secondary device. The mobile device management service 14 is configured to request, in response to the organization credentials from the secondary device being authenticated, a challenge response from the secondary device. The mobile device management service 14 is configured to receive the challenge response from the secondary device, wherein the challenge response is cryptographically signed by the secondary device with the private key, wherein the private key was transferred to the secondary device via the organization owned device. The mobile device management service 14 is configured to determine, with the public key, whether the challenge response is valid. The mobile device management service 14 is configured to validate, based on determining the challenge response is valid, enrollment of the secondary device.

The push notification service 16 includes a processor 46, the communications module 32, and a memory 48. The processor 46 of the push notification service 16 is configured to execute instructions, such as instructions physically coded into the processor 46, instructions received from software in the memory 48, or a combination of both.

The identity service 18 includes a processor 50, the communications module 34, and a memory 52. The processor 50 of the identity service 18 is configured to execute instructions, such as instructions physically coded into the processor 50, instructions received from software in the memory 52, or a combination of both. The identity service 18 is configured to validate organization credentials including using multi-factor authentication.

The token creation service 20 includes a processor 54, the communications module 36, and a memory 56. The processor 54 of the token creation service 20 is configured to execute instructions, such as instructions physically coded into the processor 54, instructions received from software in the memory 56, or a combination of both. The token creation service 20 is configured to generate security tokens including private keys and public keys.

The authentication service 22 includes a processor 58, the communications module 38, and a memory 60. The processor 58 of the authentication service 22 is configured to execute instructions, such as instructions physically coded into the processor 58, instructions received from software in the memory 60, or a combination of both. The authentication service 22 is configured to authenticate and securely sync a private key between devices (e.g., the organization owned device 10 and the secondary device 12).

The at least one organization owned device 10 includes a processor 62, the communications module 26, and a memory 64. The processor 62 of the at least one organization owned device 10 is configured to execute instructions, such as instructions physically coded into the processor 62, instructions received from software in memory 64, or a combination of both. The at least one organization owned device 10 is owned by an organization such that it is bound to the mobile device management service 14 of the organization (e.g., management infrastructure of the organization) via appropriate supply chain techniques. For example, a burnedin serial number of the at least one organization owned device 10 is registered and provided to the mobile device management service 14 of the organization for enrollment. The at least one organization owned device 10 is configured to initiate creation of a security token 70, which includes a private key 72 and a public key 74, from a token generator (e.g., the token creation service 20). The at least one organization owned device 10 is configured to securely store the private key 72. For example, the at least one organization owned device 10 can securely store the private key 72 in a secure enclave 76 of the memory 64. In certain alternative aspects, the at least one organization owned device 10 can store the private key 72 with a password management system on the at least one organization owned device 10, such that the private key 72 can be synchronized with another device (e.g., the at least one secondary device 14) based on valid login password. The password management system can be, for example, a cloud-based key management service such as, but not limited to, Apple iCloud Keychain®.

The at least one secondary device 14 includes a processor 66, the communications module 28, and a memory 68. The processor 66 of the at least one secondary device 14 is configured to execute instructions, such as instructions physically coded into the processor 66, instructions received from software in memory 68, or a combination of both.

It should be noted that although various embodiments may be described herein with reference to organization settings, this is for example only and not to be considered limiting. The teachings of the present disclosure may be applied in other mobile device environments, including but not limited to home environments, corporate environments, retail environments, government environments, organization environments, and other appropriate environments.

Figure 3:
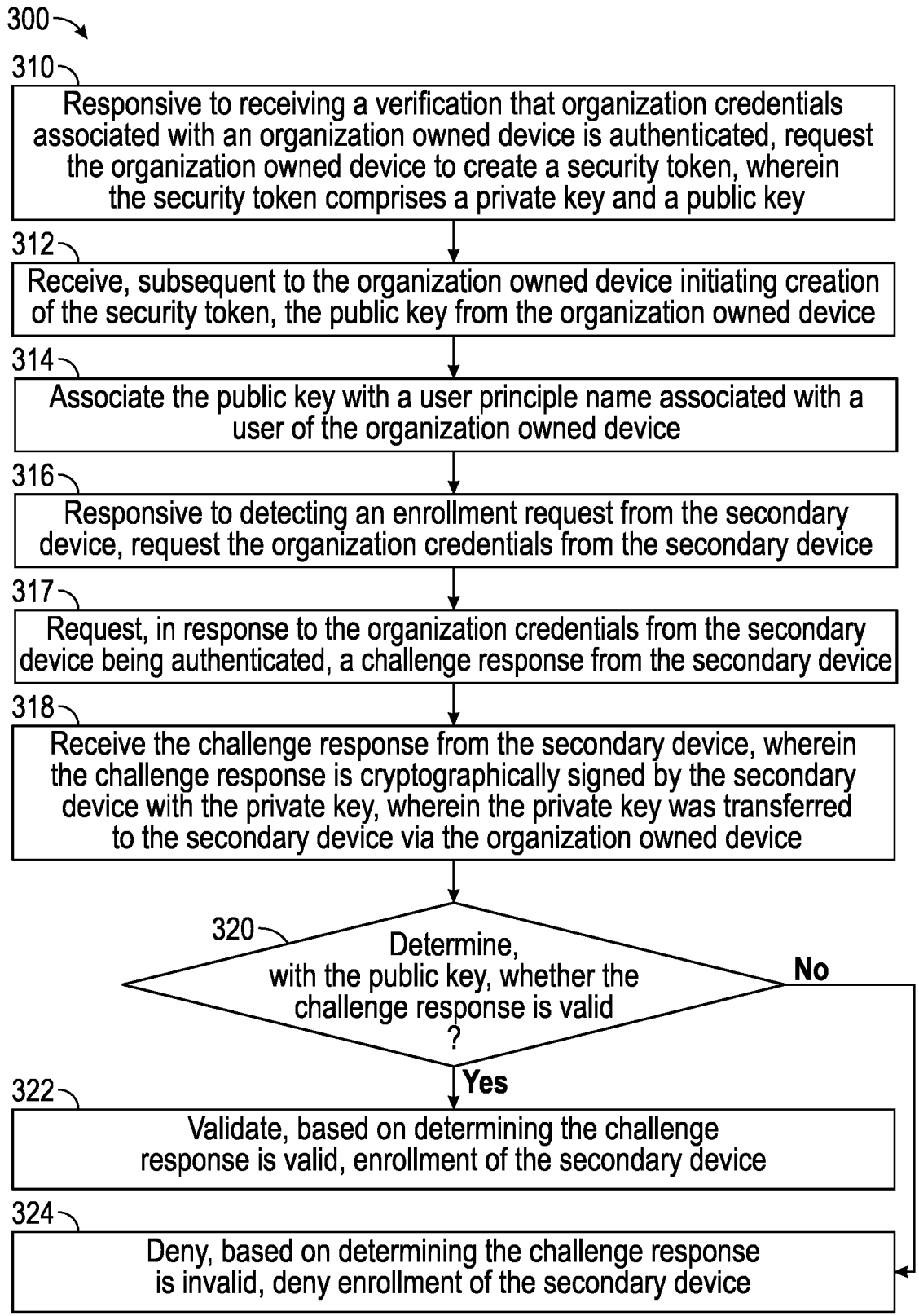
FIG. 3 illustrates an example process for enrollment validation of a secondary device using the at least one organization owned device, the at least one secondary device, mobile management service, the push notification service, the identity service, the token creation service, and the authentication service of FIG. 2.

FIG. 3 illustrates an example process 300 using the at least one organization owned device 10, the at least one secondary device 12, the mobile device management service 14, the identity service 18, the token creation service 20, the authentication service 22 and, in certain aspects, the push notification service 16. While FIG. 3 is described with reference to FIG. 2, it should be understood that the process steps of FIG. 3 may be performed by other systems.

With the at least one organization owned device 10 enrolled with the mobile device management service 14 (e.g., management infrastructure), the process 300 begins by proceeding to step 310 when, responsive to receiving verification that organization credentials 78 associated with the at least one organization owned device 10 is authenticated, the processor 40 of the mobile device management service 14 requests the at least one organization owned device 10 to create a security token 70, which includes a private key 72 and a public key 74. As depicted at step 312, the processor 40 of the mobile device management service 14 receives, subsequent to the organization owned device 10 initiating creation of the security token 70, the public key 74 from the at least one organization owned device 10. After receiving and storing the public key 74, the processor 40 of the mobile device management service 14 associates the public key 74 with a User Principle Name 80 (e.g., email address) that is associated with the at least one organization owned device 10, as depicted at step 314. In certain aspects, the User Principle Name 80 is stored in the memory 42 of the mobile device management service 14.

At step 316, responsive to detecting an enrollment request from the at least one secondary device 12, the processor 40 of the mobile device management service 14 requests the organization credentials 78 from the secondary device 12. As depicted in step 317, the processor 40 of the mobile device management service 14 requests, in response to the organization credentials 78 from the secondary device 12 being authenticated, a challenge response 88 from the at least one secondary device 12. As illustrated in step 318, the processor 40 of the mobile device management service 14 receives the challenge response 88 from the at least one secondary device 12. The challenge response 88 is cryptographically signed by the at least one secondary device 12 with the private key 72, which was previously transferred to the at least one secondary device 12 via the at least one organization owned device 10. The processor 40 of the mobile device management service 14 determines, with the public key 74, whether the challenge response 88 is valid, as shown at decision step 320. If the processor 40 of the mobile device management service 14 determines that the challenge response is valid, then it validates enrollment of the at least one secondary device 12, as illustrated at step 322. On the other hand, if the processor 40 of the mobile device management service 14 determines that the challenge response is invalid, then it denies enrollment of the at least one secondary device 12, as illustrated at step 324.

Figure 4A:
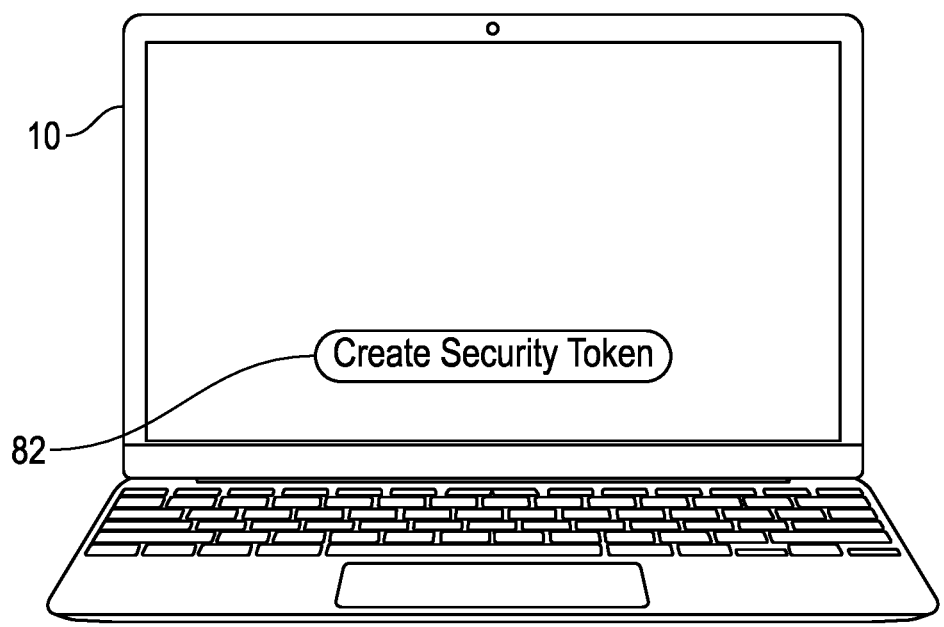
FIGS. 4A and 4B are example illustrations associated with the example process of FIG. 3.
Figure 4B:
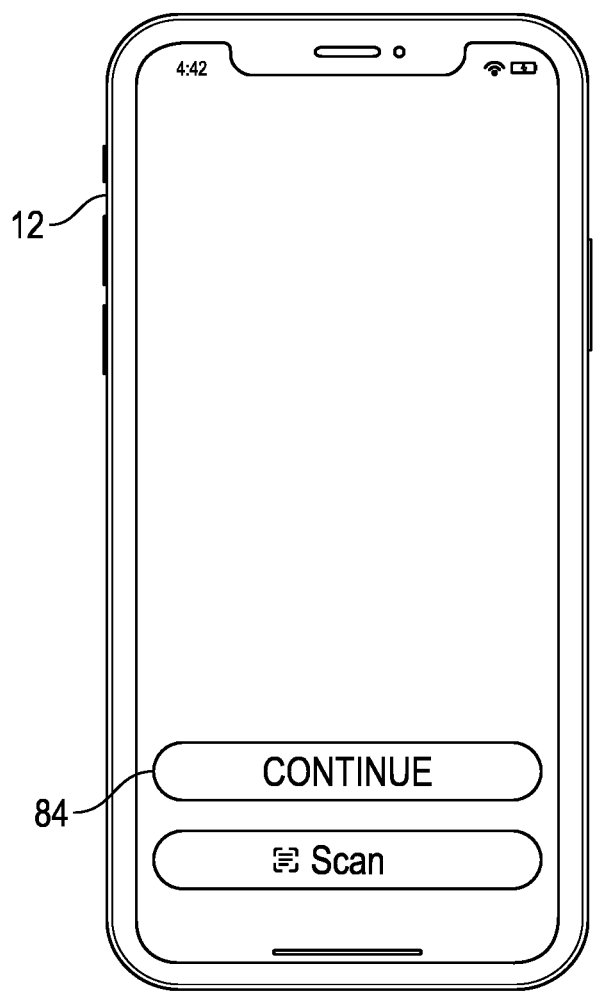

An example will now be described with reference to the example process 300 of FIG. 3 and the example figures depicted in FIGS. 4A and 4B.

In an organization environment, for example, an organization owned device 10 may be prepared for an employee (e.g., user) to use. The organization owned device 10 is owned by the organization and the serial number of the organization owned device 10 is registered with a business manager tenant and directed to the mobile device management service 14 of the organization. The mobile device management service 14 then enrolls the organization owned device 10 via appropriate supply chain techniques. In certain instances, the mobile device management service 14 will issue a client-identify certificate as part of enrollment. After the organization owned device 10 is enrolled with the mobile device management service 14, it is provided to the employee for use. The mobile device management service 14 prompts the employee using the organization owned device 10 to create a token (e.g., the token 70), which may be generated by the token creation service 20. In certain instances, the mobile device management service 14 prompts the employee using the organization owned device 10 via a web browser or similar app (see FIG. 4A, e.g., the create button 82).

The mobile device management service 14 will then request or challenge the employee to enter his organization credentials 78. After being entered, the organization credentials 78 can be verified by, for example, the identity service 18, which may be verified via multi-factor authentication. Additionally, in some instances, the mobile device management service 14 determines whether the organization owned device 10 is properly registered by validating the client-identity certificate. Once the organization credentials 78 are verified and/or the client-identity certificate is validated, the mobile device management service 14 requests or prompts the organization owned device 10, via the web browser in some instances (see FIG. 4A, e.g., the create button 82), to generate or create the security token 70 including a private key 72 and a public key 74. After creation of the security token 70, which may be generated via the token creation service 20, the private key 72 is securely stored on the organization owned device 12 and the public key 74 is transmitted to the mobile device management service 14 (e.g. the mobile device management service 14 receives the public key 74 from the organization owned device 12). The private key 72 can be stored in the secure enclave 76 of the memory 76, a personal keychain, a keychain associated with the organization, or any other appropriate system manager such as, for example, the authentication service 22. The mobile device management service 14 stores the public key 74. The mobile device management service 14 then associates the public 74 with a User Principle Name (e.g., email address) associated with the employee using the organization owned device 12. In some instances, the mobile device management service 14 stores the public key 74 as an authoritative certificate.

The employee may wish to enroll the secondary device 12 with the mobile device management service 14 (e.g., a personal device or another organization owned device that has not been enrolled yet), as well. The employee can begin the process to do so by initiating enrollment on the secondary device 12 and entering his organization credentials 78, which can be validated by, for example, the identity service 18, and may include multi-factor authentication. Once the organization credentials 78 are validated, the mobile device management service 14 detects the enrollment request from the secondary device 12 and requests (or challenges with a challenge string 86) a challenge response 88 from the secondary device 12. If the private key 72 is synced to the organization owned device 10, then the employee can tap the continue button 84 (see FIG. 4B) on the secondary device 12, which initiates verification of biometrics of the employee, and upon verification, the secondary device 12 solves the challenge via the challenge response 88 by cryptographically signing the challenge string 86 with the private key 72, and transmits the challenge response 88 to the mobile device management service 14 such that the mobile device management service 14 validates the challenge response 88 and enrolls the secondary device 12. In other instances where the private key 72 is not synced, native mechanism can be used to provide the private key 72 to the secondary device 12 from the organization owned device 10 such as, for example, using QR code scanning, wireless transferring, near-field communication, and radio-frequency identification, but transfer of the private key 72 can only be completed when the secondary device 12 is in direct physical proximity (e.g., within a few feet) of the organization owned device 10. If the challenge is not solved, then the mobile device management service 14 denies enrollment of the secondary device 12.

After successful enrollment of the secondary device 12, if the security token 70 is lost or stolen, then the mobile device management service 14 deletes association of the public key 74 with the User Principle Name 80.

Although certain embodiments and workflows are described herein with reference to performing mobile device management for a single organization owned device or single secondary device, it should be understood that mobile device management may also be performed for multiple devices, such as multiple organization owned devices or multiple secondary devices. In certain aspects, for example, the mobile device management service 14 can be configured, via the management module 44, to allow mobile device management functionality, via the push notification service 16, on select organization owned devices or a group of organization owned devices.

Figure 5:
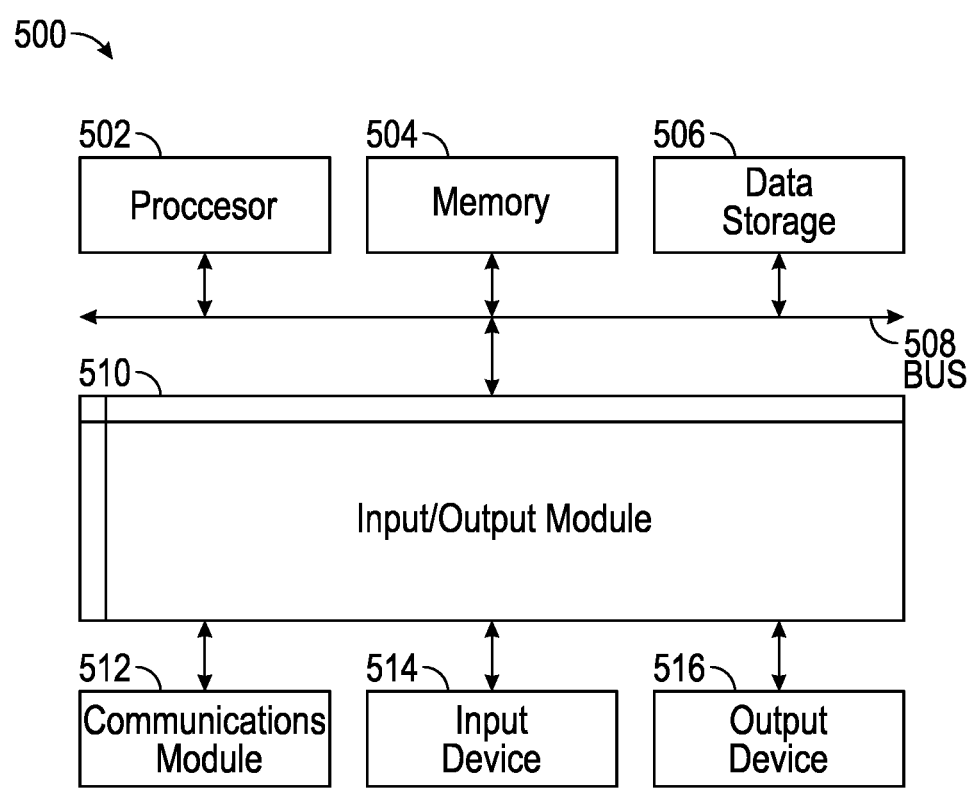
FIG. 5 is block diagram illustrating an example computer system with which the at least one organization owned device, the at least one secondary device, mobile management service, the push notification service, the identity service, the token creation service, and the authentication service of FIG. 2 can be implemented.

FIG. 5 is a block diagram illustrating an example computer system 500 with which the at least one organization owned device 10, the at least one secondary device 12, the mobile device management service 14, the push notification service 16, the identity service 18, the token creation service 20, and the authentication service 22 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., the at least one organization owned device 10, the at least one secondary device 12, the mobile device management service 14, the push notification service 16, the identity service 18, the token creation service 20, and the authentication service 22) includes a bus 508 or other communication mechanism for communicating information, and a processor 502 (e.g., the processor 40, 46, 50, 54, 58, 62, 66) coupled with bus 508 for processing information. According to one aspect, the computer system 500 can be a cloud computing server of an IaaS that is able to support PaaS and SaaS services.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., the memory 42, 48, 52, 56, 60, 64, 68), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, e.g., one or more modules of computer program instructions encoded on a computer readable medium for execution by, or to control the operation of, the computer system 500.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512.

Example communications modules 512 (e.g., the communications module 26, 28, 30, 32, 34, 36, 38) include networking interface cards, such as Ethernet cards and modems.

In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device.

According to one aspect of the present disclosure the at least one organization owned device 10, the at least one secondary device 12, the mobile device management service 14, the push notification service 16, the identity service 18, the token creation service 20, and the authentication service 22 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for enrollment validation of a secondary device, the computer-implemented method comprising:
responsive to receiving a verification that organization credentials associated with an organization owned device is authenticated, requesting the organization owned device to create a security token, wherein the security token comprises a private key and a public key;
receiving, subsequent to the organization owned device initiating creation of the security token, the public key from the organization owned device;
associating the public key with a User Principle Name associated with a user of the organization owned device;
responsive to detecting an enrollment request from the secondary device, requesting the organization credentials from the secondary device;
requesting, in response to the organization credentials from the secondary device being authenticated, a challenge response from the secondary device;
receiving the challenge response from the secondary device, wherein the challenge response is cryptographically signed by the secondary device with the private key, wherein the private key was transferred to the secondary device via the organization owned device;
determining, with the public key, whether the challenge response is valid; and
validating, based on determining the challenge response is valid, enrollment of the secondary device.

2. The computer-implemented method of claim 1, wherein the private key is securely stored on the organization owned device.

3. The computer-implemented method of claim 1, wherein the private key is transferred to the secondary device via syncing with the organization owned device and a cloud-based key management service.

4. The computer-implemented method of claim 1, wherein the private key is transferred to the secondary device, via the organization owned device by one of QR code scanning, wireless transferring, near-field communication, and radio-frequency identification, wherein transfer of the private key occurs when the secondary device is in direct physical proximity to the organization owned device.

5. The computer-implemented method claim 1, wherein associating the public key with the User Principle Name associated with the organization owned device comprises:
  generating an authoritative certificate based on the public key; and
  storing the authoritative certificate.

6. The computer-implemented method of claim 1, wherein the verification that the organization credentials associated with the organization owned device is authenticated is performed via multi-factor authentication.

7. The computer-implemented method of claim 1, wherein requesting, in response to the organization credentials from the secondary device being authenticated, the challenge response from the secondary device comprises:
  receiving an authentication verification that the organization credentials associated with the organization owned device entered on the secondary device is authenticated.

8. The computer-implemented method of claim 7, wherein the authentication verification that the organization credentials associated with an organization owned device entered on the secondary device is authenticated is performed via multi-factor authentication.

9. A system comprising:
  a memory comprising instructions; and
  a processor configured to execute the instructions which, when executed, cause the processor to:
    responsive to receiving a verification that organization credentials associated with an organization owned device is authenticated, request the organization owned device to create a security token, wherein the security token comprises a private key and a public key;
    receive, subsequent to the organization owned device initiating creation of the security token, the public key from the organization owned device;
    associate the public key with a User Principle Name associated with a user of the organization owned device;
    responsive to detecting an enrollment request from the secondary device, request the organization credentials from the secondary device;
    request, in response to the organization credentials from the secondary device being authenticated, a challenge response from the secondary device;
    receive the challenge response from the secondary device, wherein the challenge response is cryptographically signed by the secondary device with the private key, wherein the private key was transferred to the secondary device via the organization owned device;
    determine, with the public key, whether the challenge response is valid; and
    validate, based on determining the challenge response is valid, enrollment of the secondary device.

10. The system of claim 9, wherein the private key is securely stored on the organization owned device.

11. The system of claim 9, wherein the private key is transferred to the secondary device via syncing with the organization owned device and a cloud-based key management service.

12. The system of claim 9, wherein the private key is transferred to the secondary device, via the organization owned device by one of QR code scanning, wireless transferring, near-field communication, and radio-frequency identification, wherein transfer of the private key occurs when the secondary device is in direct physical proximity to the organization owned device.

13. The system of claim 9, wherein the processor is further configured to execute the instructions which, when executed, cause the processor to:
  generate an authoritative certificate based on the public key; and
  store the authoritative certificate.

14. The system of claim 13, wherein the verification that the organization credentials associated with the organization owned device is authenticated is performed via multi-factor authentication.

15. The system of claim 9, wherein the processor is further configured to execute the instructions which, when executed, cause the processor to:
  receive an authentication verification that the organization credentials associated with the organization owned device entered on the secondary device is authenticated.

16. The system of claim 15, wherein the authentication verification that the organization credentials associated with an organization owned device entered on the secondary device is authenticated is performed via multi-factor authentication.

17. A non-transitory machine-readable storage medium comprising machine-readable instructions for causing a processor to execute a method, the method comprising:
  responsive to receiving a verification that organization credentials associated with an organization owned device is authenticated, requesting the organization owned device to create a security token, wherein the security token comprises a private key and a public key;
  receiving, subsequent to the organization owned device initiating creation of the security token, the public key from the organization owned device;
  associating the public key with a User Principle Name associated with a user of the organization owned device;
  responsive to detecting an enrollment request from the secondary device, requesting the organization credentials from the secondary device;
  requesting, in response to the organization credentials from the secondary device being authenticated, a challenge response from the secondary device;
  receiving the challenge response from the secondary device, wherein the challenge response is cryptographically signed by the secondary device with the private key, wherein the private key was transferred to the secondary device via the organization owned device;
  determining, with the public key, whether the challenge response is valid; and
  validating, based on determining the challenge response is valid, enrollment of the secondary device.

18. The non-transitory machine-readable storage medium of claim 17, wherein the private key is securely stored on the organization owned device.

19. The non-transitory machine-readable storage medium of claim 17, wherein the private key is transferred to the secondary device via syncing with the organization owned device and a cloud-based key management service.

20. The non-transitory machine-readable storage medium of claim 17, wherein the private key is transferred to the secondary device, via the organization owned device by one of QR code scanning, wireless transferring, near-field communication, and radio-frequency identification, wherein transfer of the private key occurs when the secondary device is in direct physical proximity to the organization owned device.

\* \* \* \* \*